Dec. 1, 1953 W. H. GILLE 2,661,449

ELECTRONIC CONTROL APPARATUS

Original Filed June 22, 1942 2 Sheets-Sheet 1

INVENTOR.
WILLIS H. GILLE

BY George H. Fisher

ATTORNEY

Dec. 1, 1953 W. H. GILLE 2,661,449

ELECTRONIC CONTROL APPARATUS

Original Filed June 22, 1942 2 Sheets-Sheet 2

INVENTOR.
WILLIS H. GILLE

BY George H Fisher

ATTORNEY

Patented Dec. 1, 1953 2,661,449

UNITED STATES PATENT OFFICE 2,661,449

ELECTRONIC CONTROL APPARATUS

Willis H. Gille, St. Paul, Minn., assignor to Minneapolis-Honeywell Regulator Company, Minneapolis, Minn., a corporation of Delaware Original application June 22, 1942, Serial No. 447,989. Divided and this application November 1, 1948, Serial No. 57,667

14 Claims. (Cl. 318—28)

This application is a division of my copending application No. 447,989, filed June 22, 1942, and is assigned to the assignee of the present application.

The present invention relates to electronic amplifiers and particularly to amplifiers adapted for use in control systems of the type wherein a device is controlled in accordance with an electrical signal produced by means responsive to a controlling condition.

An object of the present invention is to provide an improved electronic amplifier circuit whose output is selectively intermittent or continuous, depending on the magnitude of the input signal.

A further object of the present invention is to provide an improved amplifier circuit for controlling the operation of a relay in accordance with a variable condition.

A further object of the present invention is to provide an electronic amplifier circuit having improved anti-hunt characteristics.

A further object of the present invention is to provide an improved electronic amplifier circuit for operating either of two relays in the output circuit, depending upon the phase of the input signal.

A further object of the present invention is to provide an improved electronic amplifier circuit in which weak signals are aided in operating a relay in the output circuit.

Figure 1:
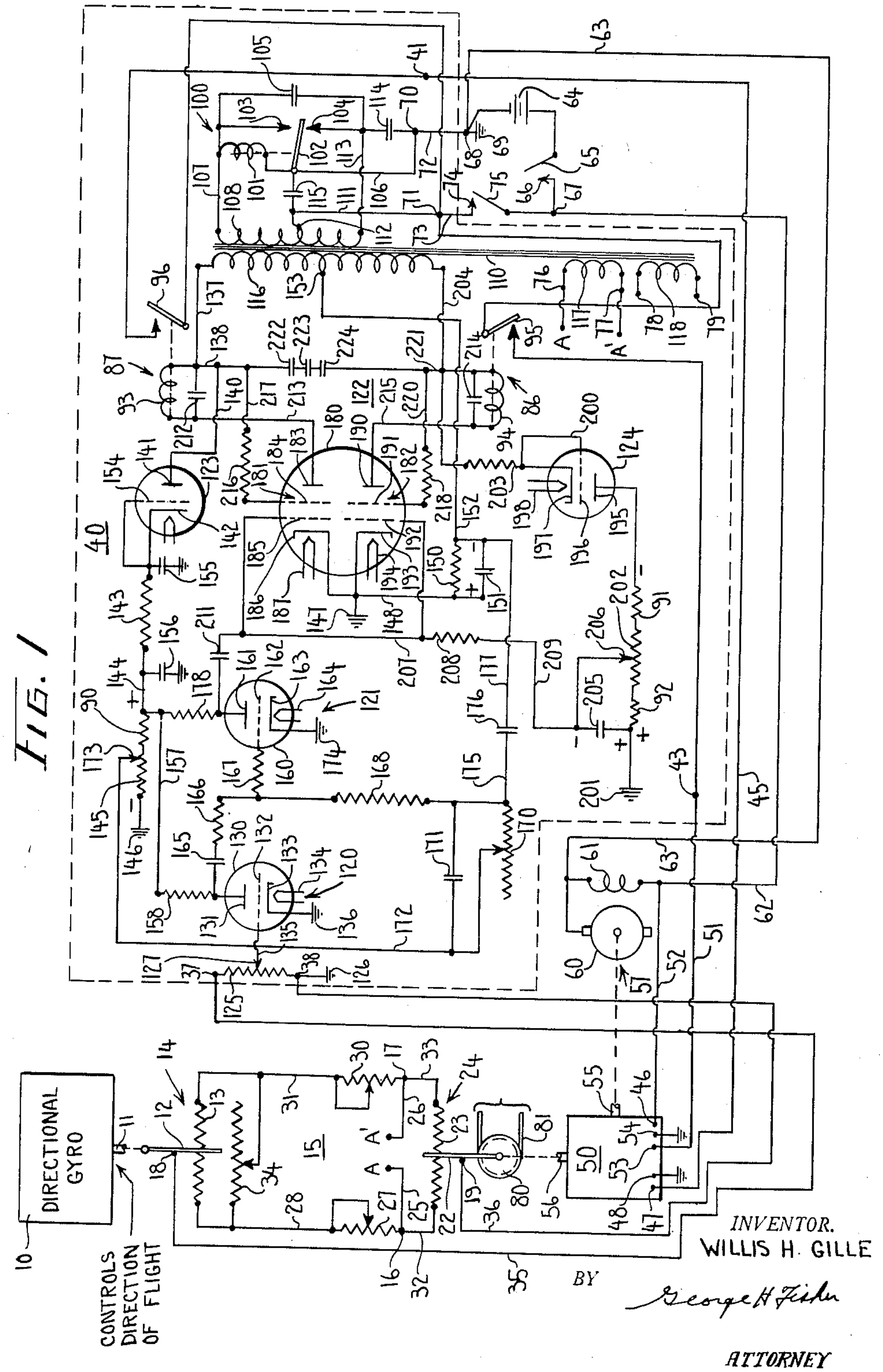
Figures 2, 3:
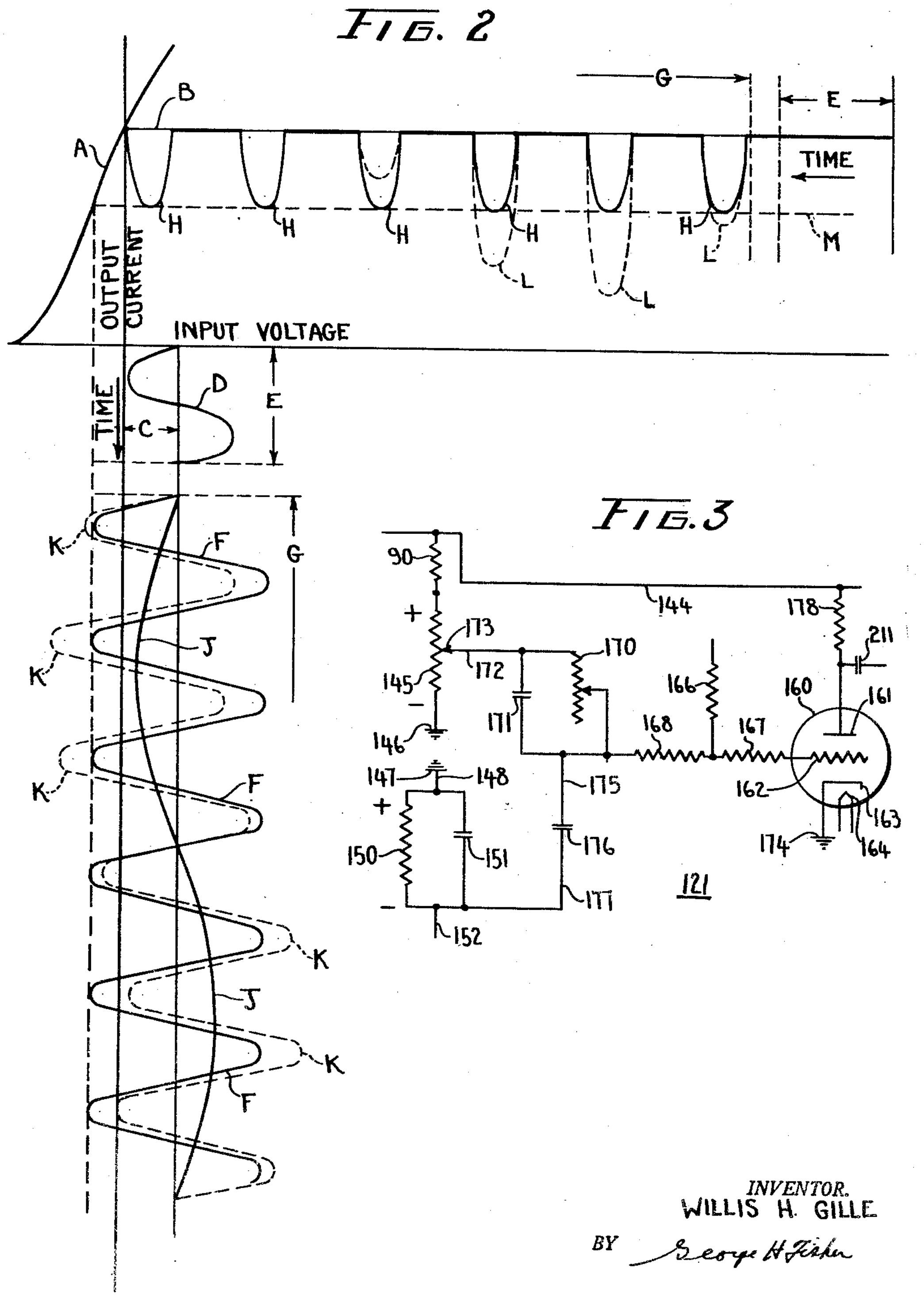

Other objects and advantages of the present invention will become apparent from a consideration of the appended specification, claims and drawings, in which:

Figure 1 is a circuit diagram of an amplifier embodying the principles of the invention shown in a control system wherein it may be used advantageously, Figure 2 is a graphical illustration of the operation of a portion of the circuit of Figure 1, and Figure 3 is a portion of the circuit of Figure 1, redrawn so that the relationship of the circuit elements to each other may be more clearly understood.

Before describing the amplifier per se, a brief description will be given of apparatus with which the amplifier is designed to cooperate.

There is shown in Figure 1, somewhat diagrammatically, a system for controlling the rudder of an aircraft. Referring to this figure, there is shown a direction-responsive device 10 which is adapted to rotate a shaft 11 in accordance with the deviation from a predetermined course of an aircraft on which the device 10 is mounted. The device 10 may be a compass of either the magnetic or any well known type, or any other suitable direction-responsive device. For the purposes of the present illustration, it is indicated by way of example, that the device 10 is a directional gyroscope.

Fixed on the shaft 11 for rotation therewith is a slider 12 which cooperates with a slidewire resistance 13. The slider 12 and the slidewire resistance 13 together form a potentiometer generally indicated at 14, hereinafter referred to as the rudder control potentiometer. The potentiometer 14 forms a part of a balanced circuit generally indicated at 15, and hereinafter referred to as the rudder control network. The rudder control network 15 is a balanced circuit generally of the Wheatstone bridge type, and includes input terminals 16 and 17, and output terminals 18 and 19. Output terminal 18 is in electrical connection with slider 12, and output terminal 19 is in electrical connection with a slider 22 which cooperates with a slidewire resistance 23. Slider 22 and slidewire 23 together form a potentiometer hereinafter referred to as the rudder rebalancing potentiometer. Input terminals 16 and 17 of rudder control network 15 are connected through conductors 25 and 26, respectively, to power supply terminals A and A'.

The network 15 includes the customary four branches of a Wheatstone bridge circuit connecting each of the input terminals with each of the output terminals. The upper left branch of network 15 connects input terminal 16 and output terminal 18, and may be traced from input terminal 16 through a variable resistance 27, a conductor 28, and the left hand part of slidewire resistance 13 to slider 12 and output terminal 18. The upper right branch of the network 15 connects input terminal 17 with output terminal 18 and may be traced from input terminal 17 through a variable resistance 30, a conductor 31, and the right hand section of slidewire resistance 13 to slider 12 and output terminal 18. The lower left branch of network 15 connects input terminal 16 with output terminal 19 and may be traced from input terminal 16 through a conductor 32 and the left hand section of slidewire resistance 23 to slider 22 and output terminal 19. The lower right branch of network 15 connects input terminal 17 with output terminal 19 and may be traced from input terminal 17 through a conductor 33 and the right hand section of slidewire resistance 23 to slider 22 and output terminal 19.

The variable resistance devices 27 and 30 are hereinafter referred to as the rudder centering adjustment rheostats.

A variable resistance device 34 is connected in parallel with the slidewire resistance 13. The resistance device 34 is hereinafter referred to as the rudder ratio adjusting rheostat.

Output terminals 18 and 19 of rudder control network 15 are connected through conductors 35 and 36, respectively, to input terminals 37 and 38 of an amplifier and power supply unit 40, which, for the sake of simplicity, will be hereinafter referred to during the description of the apparatus with which the amplifier cooperates as amplifier 40.

The amplifier 40, which is described in detail hereinafter, operates to selectively control the energization of a pair of output terminals 41 and 43. Output terminals 41 and 43 are connected by conductors 45 and 51, respectively, to terminals 47 and 53 on a power transmission unit indicated schematically at 50. The power transmission unit 50 is provided with a pair of grounded terminals 48 and 54.

Power transmission unit 50 is provided with a power input shaft 55 and a power output shaft 56. Power input shaft 55 is continuously rotated in one direction by a direct current shunt motor 57, having an armature 60 and a field winding 61. The terminals of armature 60 and field winding 61 are connected through conductors 62 and 63 to the terminals of a suitable source of electrical energy, shown as a battery 64. A switch including a switch arm 65 which is operable into engagement with a stationary contact 66 is connected in the conductor 62, so that the motor 57 may be deenergized. The conductor 63 is connected to ground at 69, thereby grounding one terminal of battery 64.

The amplifier 40 is provided with power input terminals 70 and 71. Terminal 70 is connected through a conductor 72 to the grounded terminal of battery 64. Power input terminal 71 is connected through a conductor 73, in which a switch comprising a stationary contact 74 and a movable contact arm 75 is inserted, to conductor 62, and thence to the opposite terminal of battery 64.

Amplifier 40 is also provided with a pair of power output terminals 76 and 77, which are connected through suitable conductors to power supply terminals A, A' of the rudder control network 15.

There is mounted on power output shaft 56 of the servomotor unit 50, a pulley 80 over which passes a cable 81, the ends of which are connected to suitable mechanism for operating the rudder of the aircraft on which the system is mounted. The slider 22 of the rudder rebalancing potentiometer 24 is also fixed on the shaft 56 to rotate therewith.

*Operation of rudder control in Figure 1*

When the parts are in the positions shown in the drawing, the control slider 12 and the follow up slider 22 are engaging the mid-points of their respective slidewires. Furthermore, the centering rheostats 27 and 30 have equal settings. Under these conditions, the electrical potentials of the output terminals 18 and 19 of network 15 are both equal to the median potential of the source of energy connected to input terminals 16 and 17. Since there is no potential difference between output terminals 18 and 19, no signal is applied to the signal input terminals 37 and 38 of amplifier 40.

The amplifier 40 operates, as more fully described hereinafter, in such a manner that when no signal appears at the signal input terminals 37 and 38, neither output terminal 41 nor 43 is energized. When an alternating signal is impressed on the signal input terminals 37 and 38, either the output terminal 41 or 43 is energized, depending upon the phase of the input signal.

As previously described, the power input shaft 55 of power transmission unit 50 is continuously rotated by the motor 57. Power transmission unit 50 contains a gearing arrangement, driven by motor 57, which operates through a pair of clutching members selectively energized by the amplifier 40 to control the direction of rotation of output shaft 56 depending upon the clutching member that is energized. When no current flows either in the circuit including terminals 47 and 48 or in the circuit including terminals 53 and 54, the power output shaft 56 is stationary. When the circuit including terminals 47 and 48 is energized, or when the circuit including terminals 53 and 54 is energized, a connection is completed between power input shaft 55 and power output shaft 56, such that the shaft 56 is rotated in one direction or the other, selectively, depending upon which of the two circuits mentioned is energized. A more complete description of power transmission unit 50 and its operation is to be found in my parent application 447,989, filed June 22, 1942.

Summarizing, it may be stated that the operation of amplifier 40 and power transmission unit 50 are such that when an alternating potential of the same phase as that applied to input terminals 16 and 17 of network 15 is impressed on the signal input terminals 37 and 38, the shaft 56 is rotated in a counter-clockwise direction so as to move slider 22 to the left along slide wire resistance 23. On the other hand, when an alternating signal of phase opposite to that of the potential supplied to input terminals 16 and 17 is impressed on signal input terminals 37 and 38, the power output shaft 56 is rotated in a clockwise direction, thereby moving slider 22 to the right along slidewire resistance 23. When no signal is impressed on signal input terminals 37 and 38, the shaft 56 remains stationary.

As long as the aircraft stays on the course which the directional gyroscope 10 has been set to maintain, the slider 12 is held stationary in the center of the slidewire resistance 13. When the aircraft deviates from the established course, the directional gyro 10 moves the slider 12 along the resistance 13. For example, let it be assumed that the aircraft deviates from its course in such a direction that the slider 12 is moved to the left along the slidewire 13. When this movement takes place, it will be seen that the potential of output terminal 18 is changed to a value closer to that of input terminal 16 than that of input terminal 17. There is then a potential difference between output terminals 18 and 19, and the phase of this potential difference is the same as that of the voltage applied to input terminals 16 and 17. This potential difference is impressed as a signal on the signal input terminals 37 and 38 of amplifier 40. As previously described, a potential of this phase impressed on the terminals 37 and 38 acts through the amplifier 40 and the power transmission unit 50 to cause rotation of power output shaft 56 in a counter-clockwise direction. This rotation of shaft 56 acts through pulley 80 and cables 81 to apply a corrective deflection to the rudder (not shown) so as to restore the aircraft to its predetermined course. At the same time, the slider 22 is moved to the left along slidewire resistance 23. When the slider 22 reaches a position such that the potential of output terminal 19 is equal to the new potential of output terminal 18, no further signal is applied to the amplifier signal input terminals 37 and 38, and rotation of shaft 56 ceases.

Because of the corrective deflection of the rudder, the aircraft returns to its established course. As the aircraft returns to its established course, the directional gyroscope 10 moves the slider 12 to the right along resistance 13, back towards its center position. As this motion takes place, it will be seen that the potential of output terminal 18 becomes closer to that of input terminal 17 than that of the output terminal 19. Therefore a potential difference again exists between output terminals 18 and 19, but this time its phase is opposite to that of the voltage impressed on the input terminals 16 and 17. This potential difference is impressed on the amplifier signal input terminals 37 and 38, and acts through amplifier 40 and servomotor unit 50 to cause rotation of shaft 56 in a clockwise direction. This rotation of shaft 56 acts through pulley 60 and cable 61 to restore the rudder to its normal position, and also moves the slider 22 to the right along slidewire resistance 23. When the slider 22 reaches the position shown on the drawings, no potential difference exists between output terminals 18 and 19, and the motion of shaft 56 is stopped.

It will be readily understood by those skilled in the art that if the aircraft deviates from its course in such a direction as to move slider 12 to the right, the system responds in a manner entirely analogous to that previously described. The shaft 56 is first rotated clockwise to apply a corrective deflection to the rudder and to move the slider 22 to the right along slidewire resistance 23 so as to rebalance the network 15. After the aircraft has returned to its established course because of the deflection of the rudder, the slider 12 is moved back to its center position by the directional gyroscope 10, and the system responds to drive shaft 56 counter-clockwise to remove the corrective deflection from the rudder and to drive slider 22 to the left back to the center position shown on the drawing. Operation of rheostats 27 and 30 changes the position of slider 22 with respect to slidewire 23 at which the network 15 is balanced. For example, assume that rheostat 27 is operated so that its resistance is increased and that the resistance of rheostat 30 is decreased. It will be readily understood that by such operation the potential at the slider 12 is made to approach closer to that of the input terminal 17. A potential difference then exists between output terminals 18 and 19 which is opposite in phase to the potential applied to the input terminals 16 and 17. This unbalance potential is applied to the signal input terminals 37 and 38 of amplifier 40, thereby causing shaft 56 to be rotated clockwise so as to move slider 22 to the right along resistance 23 and rebalance network 15. It will be readily understood that this action produces a deflection of the rudder which is maintained as long as the rheostats 27 and 30 remain in their adjusted positions.

The ratio adjusting rheostat 34 operates to determine the amount of movement of the rebalancing slider 22 necessary to rebalance the network 15 after a given movement of control slider 12. It will be readily understood that rheostat 34, by changing the resistance connected in parallel with slidewire resistance 13, changes the total difference of potential between the terminals of the slidewire resistance 13. When the total potential difference across resistance 13 is changed, the resistance drop per unit length of resistance 13 is also changed. The resistance drop per unit length of the slidewire resistance 23, however, remains constant. When slider 12 moves through a distance corresponding to a certain potential difference along the slidewire resistance 13, the slider 22 must move along the resistance 23 a sufficient distance to cover the same potential difference in order to rebalance the network 15. It may therefore be readily seen that if the potential change per unit length of resistance 13 is changed, the distance which the slider 22 must move to rebalance a given movement of slider 12 is also changed.

Having described the apparatus with which the amplifier of the present invention is designed to be employed, the amplifier itself will now be described.

The terminals 70 and 71 which are supplied with electrical energy from the battery 64 of Figure 1 are connected to a vibrator inverter circuit of conventional type. The vibrator comprises a coil 101 which controls the movement of a switch arm 102 between stationary contacts 103 and 104. A condenser 105 is connected between the stationary contacts 103 and 104 in order to reduce sparking at those contacts. A conductor 106 connects terminal 70 with the switch arm 102 and with one terminal of coil 101. The opposite terminal of coil 101 is connected by a conductor 107 to the upper terminal of a primary winding 108 of a power supply transformer 110. The conductor 107 is also connected to the stationary contact 103. Terminal 71 is connected by a conductor 111 to mid-point tap 112 on the transformer primary winding 108. The lower terminal of primary winding 108 is connected through a conductor 113 to stationary contact 104. A filter condenser 114 connects stationary contact 104 with grounded terminal 70. Another filter condenser 115 connects mid-point tap 112 with switch arm 102.

The operation of the inverter circuit 100, which will be readily understood by those skilled in the art, may be briefly outlined as follows:

When the switch arm 102 engages contact 104, as shown in the drawing, a circuit is completed which may be traced from power input terminal 70 through conductor 106, switch arm 102, contact 104, conductor 113, the lower half of primary winding 108, mid-point tap 112, and conductor 111 to battery terminal 71. At the same time, a circuit is completed for energizing coil 101 which may be traced from terminal 70 through conductor 106, coil 101, conductor 107, the upper half of primary winding 108, mid-point tap 112, and conductor 111 to terminal 71. The current flowing through this second circuit will be much lower than that through the first circuit traced on account of the impedance of coil 101. The net flux in the transformer core therefore has a direction determined by the direction of current flow in the lower half of primary winding 108. The energization of coil 101 causes switch arm 102 to move upwardly into engagement with contact 103. This opens the circuit through the lower half of primary winding 108, and shunts coil 101 so as to increase the current flowing in the upper half of primary winding 108. The direction of flux flowing in the transformer is then determined by the direction of current flow in the upper half of primary winding 108, being the opposite to the direction of current flow occurring when the switch arm 102 engages contact 104. Since the coil 101 has now been shunted, the switch arm 102 drops back to the lower contact 104, to which position it is biased by means not shown, thereby again causing the current flow in the lower half of primary winding 108 to predominate and again reversing the direction of flux flow in the transformer core. This sequence of events repeats itself cyclically, thereby producing an alternating flux in the transformer core 115, and inducing alternating electrical potentials in secondary windings 116 and 117 with which transformer 110 is provided.

The secondary winding 117 is the power supply winding for the bridge 15.

The secondary winding 116 supplies power to the amplifier circuit 40. The amplifier 40 comprises two preliminary voltage amplification stages 120 and 121 and a final power stage 122. A rectifier triode 123 is used to supply power to the voltage amplification stages 120 and 121, and biasing potential for one of those stages. Another rectifier triode 124 is used to supply biasing potential for the final output stage 122.

Signals applied to the input terminals 37 and 38 of amplifier 40 are impressed across a potentiometer resistance 125, one terminal of which is grounded as at 126. An adjustable tap 127 movable along the resistance 125 controls the gain of the amplifier 40. The first voltage amplification stage 120 of amplifier 40 includes a triode 130 having an anode 131, a control electrode 132, a cathode 133, and a heater element 134, which may be supplied with electrical energy from any suitable source (not shown). The input circuit of the first stage 120 may be traced from control electrode 132 through a conductor 135, tap 127, resistance 125, and ground connections 126 and 136 to cathode 133. It should be noted that this input circuit is unbiased.

The output circuits of the stages 120 and 121 are supplied with electrical energy from a rectifier circuit connected to the upper half of transformer secondary winding 116. This rectifier circuit may be traced from the upper terminal of secondary winding 116 through conductors 137, 138 and 140, anode 141, and cathode 142 of a triode 123, a resistance 143, a conductor 144, a fixed resistance 90, a potentiometer resistance 145, ground connections 146 and 147, a conductor 148, a resistance 150 in parallel with a condenser 151, and a conductor 152 to a mid-point tap 153 on transformer secondary winding 116. The triode 123 is provided with a control electrode 154 which is connected to the cathode to maintain the triode in a highly conductive condition. Filter condensers 155 and 156 are connected between the opposite terminals of resistor 143 and ground in order to by-pass high frequency components appearing in the output of the rectifier circuit. The conductor 144 serves as the positive terminal of the power supply for the amplification stages 120 and 121, and ground serves as the negative terminal. The direction of current flow through this rectifier circuit is such that the potential drop across resistance 145 renders its right-hand terminal positive with respect to its left-hand terminal, as indicated by the legend in the drawing.

The output circuit of the first stage 120 may be traced from positive power supply terminal 144 through a conductor 157, a load resistance 158, anode 131, and cathode 133, to ground at 136.

The second voltage amplification stage 121 includes a triode 160 having an anode 161, a control electrode 162, a cathode 163 and a heater element 164. Heater element 164 may be energized from any suitable source of electrical energy (not shown).

The output circuit of stage 120 is coupled to the control electrode 162 of stage 121 through a blocking condenser 165, a protective resistance 166, and a protective resistance 167.

The input circuit of stage 121 is divided into two branches. The first branch may be traced from control electrode 162, through protective resistance 167, resistance 168, variable resistance 170, and a by-pass condenser 171 in parallel, a conductor 172, a movable tap 173 associated with variable resistance 145, and ground connections 146 and 174 to cathode 163. The second branch of the input circuit of stage 121, hereinafter termed the feedback circuit, may be traced from control electrode 162 through resistances 167 and 168, a conductor 175, a condenser 176, a conductor 177, resistance 150 in parallel with by-pass condenser 151, conductor 148 and ground connections 147 and 174 to cathode 163. The output circuit of stage 121 may be traced from conductor 144 which serves as the positive power supply terminal, through a load resistance 178, anode 161, and cathode 163 to ground at 174, which is the negative terminal of the power supply.

The final output stage 122 includes a twin tetrode 180, whose individual tetrodes 181 and 182 are oppositely connected to the upper and lower halves of secondary winding 116, respectively. The tetrode 181 includes an anode 183, a first control electrode or screen grid 184, a second control electrode 185, a cathode 186, and a heater filament 187. The tetrode 182 includes an anode 190, control electrodes 191 and 192, a cathode 193, and a heater filament 194. The heater filaments 187 and 194 may be connected to any suitable source of electrical energy (not shown).

A bias potential for the main control electrodes 185 and 192 of the final stage 122 is supplied from a circuit which includes the rectifier triode 124. Triode 124 has an anode 195, a control electrode 196, a cathode 197, and a heater filament 198. The heater filament 198 may be energized from any suitable source of energy. Control electrode 196 is connected to cathode 197 by a conductor 200, so as to maintain triode 124 in a highly conductive condition whenever a sufficiently high potential of proper polarity is applied to the cathode and anode. The circuit through the rectifier triode 124 may be traced from the mid-point tap 153 of transformer secondary winding 116 through conductor 152, resistance 150 and its parallel by-pass condenser 151, conductor 148, ground connections 147 and 201, fixed resistance 92, a potentiometer resistance 202, a fixed resistance 91, anode 195, cathode 197, resistance 203, and conductor 204 to the lower terminal of secondary winding 116.

It should be noted in passing that the current flow through the rectifier circuit including triode 123 passes through resistance 150 and its parallel by-pass condenser 151 in a direction opposite to the current flow through rectifier triode 124. Since these two currents are substantially equal and opposite, and since they both flow during the same operative half cycles, that is, when the upper end of secondary winding 116 is positive with respect to the lower end, it will be seen that the net potential drop across resistance 150 produced by these two currents is zero.

A variable portion of the potential drop across resistance 202 is impressed across a condenser 205 by means of a movable tap 206 associated with resistance 202. The direction of current flow through triode 124 is such as to make the left-hand terminal of resistance 202 positive with respect to its right-hand terminal, as indicated by the legend in the drawing.

The tetrodes 181 and 182 of the final output stage 122 have a common input circuit, which may be traced from control electrodes 185 and 192 to conductor 207, resistance 208, a conductor 209, condenser 205, and ground connections 201 and 147 to cathodes 186 and 193. The output circuit of the second preliminary amplification stage 121 is coupled to the common input circuit of the tetrodes 181 and 182 through a blocking condenser 211 connected between anode 161 and conductor 207.

The output circuit of tetrode 181 may be traced from the upper terminal of transformer secondary winding 116 through conductor 137, relay winding 93 and condenser 212 in parallel, a conductor 213, anode 183, cathode 186, conductor 148, resistance 150 and its parallel by-pass condenser 151, and conductor 152 to mid-point tap 153 on transformer secondary winding 116.

The output circuit of tetrode 182 may be traced from the lower end of transformer secondary winding 116 through conductor 204, relay winding 94 and condenser 214 in parallel, the conductor 215, anode 190, cathode 193, conductor 148, resistance 150 and its parallel by-pass condenser 151, and conductor 152 to mid-point tap 153 on transformer secondary winding 116.

The control electrode 184 of tetrode 181, which is conventionally termed a screen grid, is connected through resistance 216 and conductors 217, 138 and 137 to the upper terminal of secondary winding 116. Control electrode 191 of tetrode 182 is connected through a resistance 218 and conductors 220, 221, and 204 to the lower terminal of secondary winding 116.

A group of three buffer condensers 222, 223 and 224 in series is connected across the terminals of secondary winding 116 by means of conductors 137, 138, 221 and 204.

The following table shows, by way of example, values of resistance and capacitance for the various circuit elements which have been used in one embodiment of the amplifier circuit of Figure 1:

| *Reference character of element:* | | *Electrical quantity* |
|---|---|---|
| 105 | microfarads | 1 |
| 114 | do | ¼ |
| 115 | do | 25 |
| 125 | ohms | 10,000 |
| 143 | do | 5,000 |
| 145 | do | 50,000 |
| 150 | do | 800 |
| 151 | microfarads | 25 |
| 155 | do | 10 |
| 156 | do | 10 |
| 158 | megohm | ¼ |
| 165 | microfarad | .05 |
| 166 | megohm | ½ |
| 167 | do | ½ |
| 168 | do | ½ |
| 170 | do | ½ |
| 171 | microfarad | .1 |
| 176 | do | .04 |
| 178 | megohm | ¼ |
| 202 | do | .1 |
| 203 | do | ¼ |
| 205 | microfarads | 8 |
| 208 | ohms | 150,000 |
| 211 | microfarad | .05 |
| 212 | do | 1 |
| 214 | do | 1 |
| 216 | ohms | 10,000 |
| 218 | do | 10,000 |
| 222 | microfarad | .007 |
| 223 | do | .007 |
| 224 | do | .007 |
| 90 | megohm | ½ |
| 91 | ohms | 20,000 |
| 92 | megohm | .1 |

The triodes 130 and 160 may be included in a twin triode tube. For example, a type 7F7 tube has been found satisfactory. The twin tetrode 180 may be of the type 6V6GT. The triodes 123 and 124 may be the two parts of another type 7F7 tube.

When an alternating signal potential appears at the input terminals 37 and 38 of amplifier 43, it is amplified in a conventional manner by the first preliminary stage 120, and the amplified signal is transmitted through blocking condenser 165 and is applied to the input circuit of the second voltage amplification stage 121.

The second amplification stage 121 has a peculiar input voltage-output current characteristic which may be better understood by reference to Figures 2 and 3. In Figure 2, the curve A represents the grid voltage-anode current characteristic of the triode 160, and it should be noted that the curve A is of a generally conventional form. Referring to Figure 3, it will be seen that a high resistance 167 (½ megohm) is connected in series with the control electrode 162, and that the control electrode 162 is positively biased by its connection through resistances 167, 168 and 170 and conductor 172 to the tap 173 which is movable along potentiometer resistance 145. The resistance 145 is connected between the positive power supply line 144 and ground at 146. Since the cathode 163 is grounded at 174, it will be seen that all points on the resistance 145 are positive with respect to the cathode 163. Therefore a current flow takes place through the connection from the tap 173 through conductor 172 and resistances 170, 168 and 167, control electrode 162, cathode 163, and ground 174. The potential drop due to this current flow may be considered as divided into two portions, one portion being the drop across the resistances 167, 168 and 170, and the other portion being the potential between the control electrode 162 and the cathode 163. Since the impedance of the resistances 167, 168 and 170 is very high as compared to the control electrode-to-cathode impedance of the triode 160, the voltage drop across the resistances is very much greater than the control electrode to cathode potential, and the latter potential is in fact very small.

Considering this circuit still further, it will be apparent that if the control electrode to cathode voltage tends to increase, the resulting increase in current flow causes the voltage drop across the resistances 167, 168 and 170 to incerase in proportion. This increase in the potential drop across the resistances tends to restore the control electrode to the same potential which it originally had. It may therefore be seen that the potential of the control electrode 162 is maintained at a value only slightly positive with respect to the cathode 163, and that it is not possible to increase the control electrode potential substantially in a positive direction by applying an additional positive potential to the circuit just traced, or to any point on that circuit to the left of the resistance 167.

Because of this interaction of the potential drop across resistance 167 and the positive bias potential obtained from the tap 173, the input voltage-output current characteristics of the stage 121 as a whole is somewhat different from the input voltage-output current characteristics of the triode 160 as shown at A in Figure 2. In the present discussion of the input voltage-output current characteristic of the stage 121, the input voltage is intended to signify the potential between the cathode 163 and the terminal of resistance 167 which is opposite to that terminal connected to control electrode 162. In other words, the input voltage is the potential between the left-hand terminal of resistance 167, as it appears in the drawing, and the cathode 163.

Referring now to Figure 2, it may be seen, that as a result of the action of the potential drop across resistance 167, described above, when the input voltage of the stage 121 increases from a negative value in a positive direction, the output current increases in the manner indicated by the characteristic A until the input voltage reaches a slightly positive value. After such a slightly positive value of input voltage has been reached, the potential drop across resistance 167 comes into play to maintain the control electrode potential at a substantially constant value, and hence the output current remains at a substantially constant value also. Therefore the characteristic of the stage 121 does not follow the curve A after the input voltage becomes positive, but instead follows the straight line B, indicating that the output current of the stage 121 remains substantially constant for all values of input voltage greater than a small positive value. In obtaining the characteristics A and B experimentally, it has been found that the line B makes a sharp angle with the curve A.

Any tendency of the output current of triode 160 to change is further reduced by the action of the resistance 178. It will be understood that when an increase in the current flow through the resistance 178 takes place, the voltage drop across resistance 178 increases correspondingly, thereby reducing the anode to cathode voltage applied to the triode 160. This results from the fact that the voltage supplied between the line 144 and ground is divided between the drop across resistance 178 and the drop between the anode 161 and cathode 163. The decrease in anode to cathode voltage applied to triode 160 resulting from an increase in current flow through the resistance 178, itself causes a reduction in the current flow through the anode-cathode circuit of the triode 160 thereby tending to restore the current flowing through this circuit to its previous value.

Now consider the operation of the stage 121, having the characteristics described above, in the amplifier circuit shown in Figure 1. Referring to Figure 2 as an illustration of this operation, let it be assumed that the adjustable tap 173 is set so that the potential drop across resistance 167 has a value indicated at B in Figure 2, so that the left-hand terminal of resistance 167 has a positive potential with respect to ground, which potential is equal to the distance C in Figure 2. Let it be assumed that an alternating signal potential is impressed on the amplifier input terminals 37 and 38 of a value such that the amplified signal appearing between the left-hand terminal of resistance 167 and ground is represented by the alternating wave D in Figure 2. It may be seen that the maximum value of the signal wave D is less than the positive bias potential C. Therefore, the signal wave D, superimposed upon the positive bias voltage C, is never effective to overcome the positive bias voltage so as to render the input voltage of the stage 121 negative. The output current of the triode 160 therefore remains at the same substantially constant value throughout the interval E, during which the signal voltage D is maintained. Since there is no change in the output current flowing in triode 160, no signal is transmitted through the blocking condenser 211 to the control electrodes 185 and 192 of the final power amplification stage 122. The bias voltage established on condenser 205 by means of a rectifier circuit including triode 124 has a polarity such as to maintain the control electrodes 185 and 192 negative with respect to their corresponding cathodes, as indicated by the legend in the drawing. The tap 206 is so adjusted with respect to resistance 202 that the potential across condenser 205 is just sufficient to bias both the control electrodes 185 and 192 to cutoff.

Under these conditions, when no signal is transmitted through the blocking condenser 211, the relays 86 and 87 both remain inactive.

The operation of the amplifier circuit will now be considered under the conditions which obtain when the incoming signal applied to the second stage 121 has a maximum value greater than the magnitude of the positive biasing voltage C. Conditions such as these are illustrated in Figure 2 as occurring during the interval indicated at G. In order to simplify this discussion of the operation of this circuit, it will first be described as though the feedback circuit including resistance 150 and condensers 151 and 176 were entirely absent.

Let it be presumed then that the alternating input signal superimposed on the positive bias voltage C has a value such as that indicated by the full line F in Figure 2. It will be noted that the negative peaks of the alternating signal F completely overcome the positive biasing voltage C and render the input voltage of the stage 121 periodically negative. It may readily be seen by projecting the points on the input signal F upward to the overall input voltage-output current characteristic A—B, and then projecting them to the right along a suitable time axis in a well known manner, that the input voltage represented by the positive biasing voltage C plus the alternating signal F produces in the output circuit of the triode 160 a series of negative impulses H. These negative current impulses produce corresponding positive impulses in the voltage between the anode 161 and the cathode 163. These positive voltage impulses are transmitted through the blocking condenser 211 and applied to the grids 185 and 192 of the tetrodes 181 and 182.

The time phase of the impulses is determined by the time phase of the alternating signal F, which in the system shown depends upon the direction of unbalance of the bridge circuit connected to the amplifier input terminals 37 and 38. Since, in the system shown, the bridge circuit is supplied with electrical energy from secondary winding 117 on the same transformer 110 with the secondary winding 116 which supplies the output circuit of the tetrodes 181 and 182, it should be apparent that the positive voltage impulses appearing on the grids 185 and 192 will be in phase with the anode potential impressed upon one or the other of the tetrodes 181 and 182, depending upon the direction of unbalance of the bridge circuit.

Suppose for example, that the positive voltage waves are applied to the grid 185 so as to make that grid more positive during the same half cycle that the anode 183 is positive with respect to the cathode 186. Corresponding current impulses will then appear in the output circuit of tetrode 181. Each impulse energizes the relay winding 93 and also charges the condenser 212. During the alternate half cycles when no impulse is being transmitted by the tetrode 181, the condenser 212 discharges through the winding 93, thereby maintaining it energized. Energization of relay winding 93 operates through servomotor 50 in the manner previously described to rebalance the bridge circuit and reduce the magnitude of the incoming signal potential to a value less than that of the positive bias voltage C. After the incoming signal potential has been so reduced, the relay winding 93 is no longer energized and the servomotor 50 is stopped.

It should be noted that, because of the action of the positive bias voltage C, the negative peaks of the input voltage and hence the negative peaks H of the output current are somewhat less than a half cycle in length. Because of this limitation of the length of the impulses, the present amplifier circuit is not critical with respect to the phase of the control electrode potential in the final stage as compared with the anode-cathode potential in that stage. It has been found that in any amplifier circuit, particularly one wherein a plurality of stages are cascaded, a small but nevertheless appreciable phase shift takes place between the signal impressed on the input circuit and the signal produced at the output circuit. Because of this phase shift, a signal of a full half cycle duration appearing on the control electrodes 185 and 192 might overlap both half cycles of the wave during which the anodes 183 and 190 are alternately positive. If the duration of the signal impulses reaching the final stage is limited to less than one-half cycle, as in the present amplifier, considerable latitude as to phase shift of the signal from its normal phase position in either direction is permissible without causing erroneous operation of the two relays, which are to be selectively controlled in accordance with the phase of the signal.

The possibility of erroneous energization of the relays 86 and 87 due to phase shift of the signals is further reduced in the present amplifier by the negative bias on the final stage. The control electrodes of the final stage may be biased sufficiently negatively that an appreciable differential exists between the bias potential and the minimum control electrode potential necessary to produce an output current large enough to energize the relays. The phase of the signal applied to the control electrodes of the final stage may therefore shift by an amount corresponding to the time required for the signal to increase to a value corresponding to that differential without causing erroneous operation of the relays.

The operation of the feedback circuit from the final stage 122 to the second stage 121, and its effect upon the operation of the amplifier as a whole, will now be considered. Referring to Figure 1, it will be seen that when the tetrodes 181 and 182 are both non-conductive, no current flows through the resistance 150 and hence no potential difference is maintained across its terminals. If the control electrodes 185 and 192 are not biased to cut-off, a small current flow continuously takes place through the resistance 150, and a small potential drop is maintained across its terminals. Since the operation of the feedback circuit is the same, regardless of whether the normal potential across the resistance 150 is assumed to be zero or some positive value, the operation of this circuit will be considered for the present as though the normal potential across resistance 150 were zero, in order that this explanation may be simplified as much as possible. By the normal potential across the resistance 150 is meant the potential which exists thereacross when no signal is impressed through the blocking condenser 211 to the control electrodes 185 and 192 of the final stage 122. It is believed that if the operation of this circuit is explained when the normal potential across resistance 150 is zero, that its operation under other normal potential conditions will be apparent to those skilled in the art.

Referring to Figure 3, it will be seen that when no potential drop exists across resistance 150, that the potential across condenser 176 is equal to the potential between tap 173 and ground, less the potential drop due to current flow through the resistance 170. This potential across condenser 176 is substantially constant, and hence has no effect on the input circuit of the stage 121.

Let it now be assumed that one of the tetrodes 181 or 182 becomes conductive, thereby establishing a potential drop across resistance 150. This potential drop has a polarity such that the upper terminal of resistance 150, as it appears in Figure 3, is positive with respect to the lower terminal. The condenser 151 is provided to receive a charge during the half cycles when current is flowing through one of the tetrodes in the final circuit, and to discharge through the resistance 150 during the half cycles when no current is flowing, so as to maintain the potential drop across resistance 150 substantially constant as long as signals are applied to the control electrodes of the final stage 122.

Referring to Figure 3, it may be seen that the potentials across resistance 145 and resistance 150 are effectively in series in a loop circuit which may be traced from tap 173 through resistance 145, ground connections 146 and 147, conductor 148, resistance 150, conductor 177, condenser 176, conductor 175, rheostat resistance 170 and condenser 171 in parallel, and the conductor 172 to tap 173. Considering this loop circuit, it may be seen that as the potential drop across resistance 150 increases from zero, the potential applied to the terminals of condenser 176 likewise increases. A charging current therefor flows through the condenser 176 and the direction of flow of this charging current is from tap 173 through resistance 170 and conductor 175 to condenser 176. This charging current produces an additional potential drop across resistance 170 which makes its lower terminal more negative. The variation of the input voltage applied to stage 121 as a result of this charging current is illustrated in Figure 2 by the curve J.

This additional negative potential applied to the input circuit of stage 121 tends to increase the magnitude of the voltage pulses in the output circuit of that stage. These increased output voltage pulses are in turn reflected in an increased current flow through the resistance 150, with a resulting increase in the charging current flow through resistance 170, thereby making the input voltage of the stage 121 still more negative. The action of the feedback circuit is therefore cumulative but continues so only for a short time, because of the tendency of the tetrodes 181 and 182 of the final stage to become saturated. As the current flow through the resistance 150 approaches its limiting value, which is determined by the saturation of the tetrode through which the current is flowing, the charging current flowing through the resistance 170 begins to decrease in value. This decrease in the potential drop across resistance 170 allows the input voltage of stage 121 to become more positive, thereby decreasing the magnitude of the voltage pulses in the output circuit of stage 121. A corresponding decrease takes place in the potential drop across resistance 150. As soon as the potential drop across resistance 150 begins to decrease, the potential applied to the plates of condenser 176 is decreased, and the condenser therefore begins to discharge. A discharging current then flows in a direction from condenser 176 through conductor 175, resistance 170, tap 173, resistance 145, and connection 148 to ground. This current flowing through resistance 170 is now in the opposite direction from the charging current which previously flowed therein, and the potential drop produced by this current in resistance 170 is now of a polarity such as to render the input voltage of stage 121 more positive. The magnitude of the voltage pulses appearing in the output circuit of the stage 121 are thereby further decreased. It may therefore be seen that the effect of the feedback circuit is now becoming cumulative in the opposite direction.

The net effect of the feedback circuit is to supply to the input circuit of stage 121 an alternating potential such as is represented by the curve J in Figure 2. Although this curve is shown as substantially a sine wave, it will be readily understood that the shape of the wave may substantially depart from a true sine without interference with the operation of the amplifier circuit. This feedback signal J when added to the input signal F and the positive bias voltage C produces a net input voltage for the amplifier stage 121 which is of the character indicated by the curve K shown in dotted lines in Figure 2.

It may therefore be seen that when an alternating signal of constant amplitude is impressed through the blocking condenser 165 to the input circuit of stage 121, the feedback circuit operates to alternately increase and decrease the pulsations which are passed through the second stage 121 and impressed on the control electrodes 185 and 192 of the final stage 122. This characteristic is of great value when the alternating input signals are just sufficiently large to cause current impulses in the output of stage 121, but not large enough to produce voltage impulses on the grids 185 and 192 of the final stage sufficient to overcome the negative bias of that stage and cause operation of the relay. Under such conditions, the feedback circuit comes into play and causes a periodical increase in the magnitude of the current pulses so that the relay is periodically operated, thereby causing the servomotor 50 to intermittently move the control device along.

For example, in the operation as illustrated in Figure 2, let it be assumed that a current impulse of an amplitude greater than the distance between the line B and the line M is necessary to operate upon condenser 211 if the negative bias of the final stage 122 is to be overcome so as to cause operation of one of the relays. Under such conditions, an alternating input signal of constant amplitude, such as the curve F, would produce current impulses H in the output circuit of stage 121, which would not cause operation of a relay if the feedback circuit were not provided. The feedback circuit comes into play, however, and transforms the input potential of the stage 121 from the value indicated by the curve F to the value indicated by the curve K. Therefore, the current pulsations in the output of stage 121 are of a magnitude indicated by the dotted lines L in Figure 2. It will be seen that the amplitude of the pulsations L substantially exceeds the distance between the line B and the line M, thereby causing energization of one of the relays. Because of the operation of the condenser in parallel with the particular relay which is energized, the relay remains energized over the period of at least three cycles because of the saturation characteristics of the tetrodes during which the impulses L are greater than the distance between the lines B and M.

As a result of the action of the feedback circuit, as soon as the amplitude of the alternating input signal exceeds the positive bias voltage C, a particular relay to be selected in accordance with the phase of the signal is energized for spaced periods of time. As the magnitude of the alternating input signal increases, the frequency of these spaced periods of time remains the same, but the duration of each period of energization increases, so that the average rate of operation of the servomotor 50 is increased in accordance with the magnitude of the input signal. It may also be seen that as the magnitude of the alternating input signal continues to increase, it will eventually reach such a value that the feedback signal J will not be great enough to overcome it and periodically deenergize the relay. When such a value of alternating input signal is reached, the relay selected is continuously energized.

By adjustment of the tap 173 along the resistance 145, the positive bias voltage indicated at C in Figure 2 may be adjusted to any desired value. This positive bias voltage determines the minimum alternating signal passing through blocking condenser 211 which causes operation of the relay. In other words, the adjustment of tap 173 along resistance 145 regulates the sensitivity of the control system. Adjustment of rheostat resistance 170 varies the amplitude of the potential drop due to the charging and discharging current of the condenser 176, and hence varies the amplitude of the feedback signal applied to the input of stage 121. By adjusting the amplitude of this feedback signal, the range of values of alternating input signal which cause intermittent operation of the relays may be established. In other words, while adjustment of the tap 173 along resistance 145 regulates the value of input signal at which the relay starts to be intermittently operated, adjustment of rheostat 170 determines the value of the input signal at which intermittent operation of the relay ceases and continuous operation begins. The rheostat 170 should not be adjusted to make the amplitude of the feedback voltage J greater than the magnitude of the positive biasing potential C, or a condition might be obtained wherein both relays would be operated simultaneously upon the occurrence of a large alternating input signal.

Adjustment of rheostat 170 also changes the time constant of the feedback circuit to some extent and hence affects the frequency of the feedback signal J. The particular frequency chosen is unimportant, however, as long as it is sufficiently high to permit the desired sensitivity of the system.

It may therefore be seen that when the amplifier 40 is used in conjunction with the power transmission unit 50 that the power output shaft of the transmission unit is operated at an average rate which varies in accordance with the magnitude of the signal impressed on the amplifier input terminal.

The reason for operating the rudder at a rate proportional to the resulting of the deviation and the rate of deviation is that most aircraft have an inherent tendency to "hunt," or oscillate, about a vertical axis. In other words, the aircraft tends to change its direction alternately to opposite sides of the course which it is desired to maintain. It has been found that this tendency may be overcome by introducing into the control system a signal proportional to the rate of deviation of the aircraft from its desired course. On the other hand, there is substantially no tendency of the usual aircraft to hunt about any horizontal axis. If such a tendency were found, it might be overcome in a similar manner.

While I have shown and described a preferred embodiment, other modifications thereof will readily occur to those skilled in the art, and I therefore wish my invention to be limited only by the scope of the appended claims.

I claim as my invention:

1. An electrical circuit, comprising in combination, an electrical discharge device having an anode, a cathode, and a control electrode, an output circuit for said device including said anode and cathode, a fixed resistance, an input circuit for said device including said resistance, said control electrode and said cathode in a series branch thereof, means, connected to said series branch, for applying a biasing potential across said series branch of a polarity such that said control electrode is positive with respect to said cathode, the potential difference developed across said resistance upon a flow of current through said series branch being effective to limit the potential of said control electrode to a value only slightly positive with respect to said cathode, means, connected to said series branch, for applying a first variable signal potential across said series branch, said biasing potential applying means cooperating with said resistance to prevent any substantial variation of the current in said output circuit except when said signal potential is opposite said biasing potential in polarity and greater than said biasing potential in magnitude, and means, connected to said series branch, for impressing across said series branch a second variable signal potential variable in magnitude dependent upon the value of said first signal potential and periodically varying with an amplitude less than the magnitude of said biasing potential, so as to periodically vary the magnitude of the variations in said output current caused by said first signal.

2. An electrical circuit, comprising in combination, an electrical discharge device having an anode, a cathode, and a control electrode, an output circuit for said device including said anode and cathode, a fixed resistance, an input circuit for said device including said resistance, said control electrode and said cathode in a series branch thereof, means, connected to said series branch, for applying a biasing potential across said series branch of a polarity such that said control electrode is positive with respect to said cathode, the potential difference developed across said resistance upon a flow of current through said series branch being effective to limit the potential of said control electrode to a value only slightly positive with respect to said cathode, means, connected to said series branch, for applying a first periodically varying signal potential across said series branch, said biasing potential applying means cooperating with said resistance to prevent any substantial variation of the current in said output circuit except when said signal potential is opposite said biasing potential in polarity and greater than said biasing potential in magnitude, a control device connected in said output circuit and operated in response to variations in said output current in excess of a predetermined value, and means, connected to said series branch, for impressing across said series branch a second periodically varying signal potential variable in magnitude dependent upon the value of said first signal potential, said second potential being effective when said first signal potential has a constant amplitude greater than said biasing potential, to periodically vary the amplitude of the variations of said output current.

3. Control apparatus, comprising in combination, an electrical control device operative when supplied with current in excess of a predetermined value, means for producing an alternating signal potential of amplitude variable in accordance with a condition indicative of the need for operation of said control device, amplifier means connected to said signal potential producing means and responsive to said signal potential and effective when said signal potential exceeds a minimum value to produce an output current corresponding to the excess of said signal potential over said minimum value, means connecting said control device to said amplifier means so that the output current is operative upon said control device and means associated with said amplifier means and controlled by said signal potential for applying to said amplifier means a voltage variable in magnitude dependent upon the value of said signal potential for periodically varying the output current thereof so as to cause at least periodical operation of said control device whenever said potential exceeds said minimum value.

4. Control apparatus, comprising in combination, a current responsive electrical control device operable between first and second states of activity in accordance with the magnitude of said current and having an appreciable differential between the current values which cause operation of said control device between said states of activity in opposite senses, voltage producing means for producing an alternating signal potential of amplitude variable in accordance with a condition indicative of the need for operation of said control device, amplifier means connected to said voltage producing means and responsive to said signal potential and effective when said potential exceeds a minimum value to produce an output current corresponding to the excess of said signal over said minimum value, means associated with said amplifier means and controlled by said signal potential for applying to said amplifier means a voltage variable in magnitude dependent upon the value of said signal potential for periodically varying the output current thereof so as to cause at least periodical operation of said control device whenever said potential exceeds said minimum value, and means connected to said amplifier means for varying said minimum value so as to control the range of values of said condition wherein operation of said control device is effected.

5. In combination: an electronic amplifier having at least one preliminary voltage amplification stage and a final power amplification stage, each stage having an input circuit and an output circuit; a connection between a source of variable electrical potential and the input circuit of the first amplifier stage; a connection between the output circuit of each preliminary amplifier stage and the input circuit of each succeeding amplifier stage; and feedback circuit means connected between the output circuit of said final stage and the input circuit of said first stage for impressing a feedback potential from the output circuit of said final stage on the input circuit of said one stage and operating to cause intermittent pulsations in said final stage output circuit only when signals of small magnitude are impressed on said first stage input circuit.

6. In combination: an electronic amplifier having at least one preliminary voltage amplification stage and a final power amplification stage, each stage having an input circuit and an output circuit; a connection between a source of variable electrical potential and the input circuit of the first amplifier stage; means connecting the output circuit of each preliminary stage to the input circuit of the succeeding stage; means connected to the input circuit of one of said preliminary stages for applying a positive bias potential to said input circuit; and feedback circuit means, connected between the output circuit of the final stage and the input circuit of said one stage, for impressing a feedback potential from the output circuit of said final stage on the input circuit of said one stage, said positive bias potential, and said feedback potential interacting to cause intermittent pulsations in said final stage output circuit only when signals of small magnitude are impressed on said first stage input circuit.

7. In combination: an electronic amplifier having at least one preliminary voltage amplification stage and a final power amplification stage, each stage having an input circuit and an output circuit; a connection between a source of variable electrical potential and the input circuit of the first amplifier stage; means connecting the output circuit of each preliminary stage to the input circuit of the succeeding stage; means connected to the input circuit of one of said preliminary stages for applying a positive bias potential to said input circuit, feedback circuit means, including an impedance means, connected between the output circuit of the final stage and the input circuit of said one stage, for impressing a feedback potential from the output circuit of the final stage on the input circuit of said one stage, said positive bias potential and said feedback potential interacting to cause intermittent pulsations in said final stage output circuit only when a signal potential of small magnitude is impressed on said first stage input circuit; and means connected to said impedance means for adjusting said impedance means so as to vary the range of magnitudes of said signal potential wherein said intermittent pulsations are effected.

8. An electrical circuit, comprising in combination: a first electrical discharge device having an anode, a cathode and a control electrode; a fixed resistance; an input circuit for said first device including said resistance, said control electrode and said cathode in a series branch thereof; an output circuit for said first device including said anode and said cathode; a second and a third electrical discharge device each having an anode, a cathode and a control electrode; means electrically connecting said control electrodes of said second and third devices together; means connecting said cathodes of said second and third devices together so that said second and third devices have a common input circuit; a fixed impedance; means electrically connecting said output circuit of said first device to said common input circuit of said second and third devices through said fixed impedance, a first and a second control device; an output circuit for said second discharge device including its anode and cathode and an output circuit for said third discharge device including its anode and cathode, said output circuits having a common portion including their cathodes; means coupling each of said control devices to one of said output circuits; means connecting said output circuits to a source of alternating electrical energy so that the potentials applied to said output circuits are in phase opposition; means connected to the series branch in the input circuit of said first discharge device for applying a bias potential across said series branch of a polarity such that said control electrode is positive with respect to said cathode, the potential difference developed across said resistance upon a flow of current through said series branch being effective to limit the potential of said control electrode to a value only slightly positive with respect to said cathode; means connected to said series branch for applying a first variable signal potential across said series branch, said biasing potential applying means cooperating with said resistance to prevent any substantial variation of the current from the anode of said first discharge device except when said signal potential is opposite said biasing potential in polarity and greater than said biasing potential in magnitude; and feedback circuit means connected between the common portion of the output circuits of said second and third discharge devices and the input circuit of said first discharge device for connecting a feedback potential from the common portion of the output circuits of said second and third discharge devices to the input circuit of said first discharge device, said positive bias potential, said signal potential and said feedback potential interacting to cause intermittent pulsations in said second and said third discharge device output circuits when signals of small magnitude are impressed on said first discharge device input circuit.

9. An electrical circuit, comprising in combination: a first electrical discharge device having an anode; a cathode and a control electrode; a fixed resistance; an input circuit for said first device including said resistance, said control electrode and said cathode in a first series branch thereof; an output circuit for said first device including said anode and said cathode; a second electrical discharge device having an anode, a cathode and a control electrode; a fixed impedance; an input circuit for said second device including said impedance, said control electrode and said cathode in a second series branch thereof; means electrically connecting said output circuit of said first device to said second series branch; a load device; an output circuit for said second discharge device including its anode and cathode; means coupling said load device to said output circuit; means connecting said output circuit to a source of alternating electrical energy; means connected to said first series branch for applying a bias potential across said first series branch of a polarity such that said control electrode is positive with respect to said cathode, the potential difference developed across said resistance upon a flow of current through said first series branch being effective to limit the potential of said control electrode to a value only slightly positive with respect to said cathode; means connected to said first series branch for applying a first variable signal potential across said first series branch, said biasing potential applying means cooperating with said resistance to prevent any substantial variation of the current from the anode of said first discharge device except when said signal potential is opposite said biasing potential in polarity and greater than said biasing potential in magnitude; and feedback circuit means connected between the output circuit of said second discharge device and the input circuit of said first discharge device for connecting a feedback potential from the output circuit of said second discharge device to the input circuit of said first discharge device, said positive bias potential, said signal potential and said feedback potential interacting to cause intermittent pulsations in said second discharge device output circuit when signals of small magnitude are impressed on said first discharge device input circuit.

10. In combination: means producing a signal voltage; amplifier means connected to said signal voltage producing means and operative to produce an output current when the signal voltage exceeds a minimum magnitude; a control device so connected to said amplifier means as to become operative upon the output current exceeding a minimum value; and means independent of said control device connected to said amplifier means and dependent upon the output current, when the signal voltage is greater than a minimum magnitude and less than a maximum magnitude, to produce a periodically varying voltage which interacts with the signal voltage to produce an effective periodically varying voltage of such magnitude as to produce an output current which causes intermittent operation of said control device.

11. In combination: means producing a signal voltage; amplifier means connected to said signal voltage producing means and operative to produce an output current when the signal voltage exceeds a minimum magnitude; a control device so connected to said amplifier means as to become operative upon the output current exceeding a minimum value; and means independent of said control device connected to an intermediate portion of said amplifier means and effective when the output current is greater than a predetermined magnitude to cause a variable voltage to be applied to said intermediate portion of said amplifier means in such a manner as to cause said amplifier means to produce an output current which causes at least intermittent operation of said control device when the signal voltage is above a first value and below a second higher value.

12. In combination: means producing a signal voltage; amplifier means connected to said signal voltage producing means and operative to produce an output current when the signal voltage exceeds a minimum magnitude; a relay so connected to said amplifier means as to become operative upon the output current exceeding a minimum value; and means independent of said relay connected to an intermediate portion of said amplifier means and effective when the output current is greater than a predetermined magnitude to cause a variable voltage to be applied to said intermediate portion of said amplifier means in such a manner as to cause said amplifier means to produce an output current which causes at least intermittent operation of said relay when the signal voltage is above a first value.

13. In a control circuit, two vacuum tubes, means for operating said tubes, a relay in the output circuit of each of said tubes, a pulsating voltage source common to the cathodes of both of said vacuum tubes, one of said tubes having a signal impressed on its input circuit, said pulsating voltage source causing intermittent operation of one of said relays upon deviation of said signal from a desired value, a power means comprising a motor responsive to said relay operation to correct said signal to said desired value.

14. In a device of the character described, the combination which includes a pair of discharge devices having a cathode, anode and grid electrodes, a first source of alternating current potentials comprising a center tapped transformer winding having the center tap connected to said cathode electrodes and the end terminals connected to said anode electrodes of said devices, a second source of alternating current potentials connected between the grid and cathode electrodes of said devices, said connections being such that in one of said devices the cathode-grid voltage is in phase with the cathode-plate voltage and in the other of said devices the corresponding voltages are in phase opposition whereby one or the other of said devices may become conductive depending on the phase of the potential applied by said second source, output means in circuit with said anode electrodes and responding in a first mode to current flowing in one of said devices and in a second mode to current flowing in the other of said devices, a rectifier and an impedance connected in series between said center tap and one of said end terminals for developing a rectified voltage, said impedance being connected to said cathode electrodes, and means for applying at least a portion of said rectified voltage developed across said impedance between said grid and cathode electrodes of both of said pair of devices.

WILLIS H. GILLE.

References Cited in the file of this patent

UNITED STATES PATENTS

| Number | Name | Date |
|---|---|---|
| 1,858,425 | Wittkuhns | May 17, 1932 |
| 1,931,660 | Kautter | Oct. 24, 1933 |
| 1,956,711 | Bellescize | May 1, 1934 |
| 1,966,607 | Brown | July 17, 1934 |
| 2,175,920 | Schnarz | Oct. 10, 1939 |
| 2,175,921 | Schnarz | Oct. 10, 1939 |
| 2,316,875 | Laboulais | Apr. 20, 1943 |
| 2,442,238 | Haungs | May 25, 1948 |
| 2,425,733 | Gille | Aug. 19, 1947 |
| 2,476,849 | Ergen | July 19, 1949 |